United States Patent
Takami et al.

(10) Patent No.: US 12,166,167 B2
(45) Date of Patent: Dec. 10, 2024

(54) SECONDARY BATTERY, BATTERY PACK, VEHICLE, AND STATIONARY POWER SUPPLY

(71) Applicant: KABUSHIKI KAISHA TOSHIBA, Minato-ku (JP)

(72) Inventors: Norio Takami, Yokohama (JP); Shinsuke Matsuno, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 978 days.

(21) Appl. No.: 16/799,944

(22) Filed: Feb. 25, 2020

(65) Prior Publication Data

US 2020/0194823 A1  Jun. 18, 2020

Related U.S. Application Data

(63) Continuation of application No. PCT/JP2019/007806, filed on Feb. 28, 2019.

(30) Foreign Application Priority Data

Sep. 18, 2018 (JP) .................................. 2018-173574

(51) Int. Cl.
*H01M 10/056* (2010.01)
*H01M 10/0525* (2010.01)
*H01M 10/0568* (2010.01)
*H01M 10/42* (2006.01)
(Continued)

(52) U.S. Cl.
CPC ..... *H01M 10/056* (2013.01); *H01M 10/0525* (2013.01); *H01M 10/0568* (2013.01); *H01M 10/425* (2013.01); *H01M 50/449* (2021.01); *H01M 2010/4271* (2013.01); *H01M 50/489* (2021.01); *H01M 2300/0025* (2013.01);
(Continued)

(58) Field of Classification Search
None
See application file for complete search history.

(56) References Cited

U.S. PATENT DOCUMENTS

| | | |
|---|---|---|
| 4,207,388 A | 6/1980 | Erbacher et al. |
| 4,463,071 A | 7/1984 | Gifford et al. |
| 5,552,241 A | 9/1996 | Mamantov et al. |

(Continued)

FOREIGN PATENT DOCUMENTS

| | | |
|---|---|---|
| JP | 4-349365 A | 12/1992 |
| JP | 2007-87909 A | 4/2007 |
| WO | WO 2011/013254 A1 | 2/2011 |

OTHER PUBLICATIONS

International Search Report issued Jun. 11, 2019 in PCT/JP2019/007806 filed on Feb. 28, 2019, 4 pages.

(Continued)

*Primary Examiner* — Nathanael T Zemui
(74) *Attorney, Agent, or Firm* — Oblon, McClelland, Maier & Neustadt, L.L.P.

(57) ABSTRACT

According to one embodiment, a secondary battery includes a positive electrode, a negative electrode and a separator. The positive electrode includes a first electrolyte containing aluminum ions. The negative electrode is capable of allowing lithium ions to be inserted and extracted. The separator is disposed between the positive electrode and the negative electrode. The separator has lithium ion conductivity.

20 Claims, 6 Drawing Sheets

(51) Int. Cl.
H01M 50/449 (2021.01)
H01M 50/489 (2021.01)

(52) U.S. Cl.
CPC ............... *H01M 2300/0068* (2013.01); *H01M 2300/0091* (2013.01)

(56) References Cited

U.S. PATENT DOCUMENTS

| | | | | |
|---|---|---|---|---|
| 2011/0311884 | A1* | 12/2011 | Armand | C07D 233/58 204/157.4 |
| 2012/0183836 | A1 | 7/2012 | Harada et al. | |
| 2014/0011100 | A1* | 1/2014 | Lee | H01M 10/052 429/189 |
| 2015/0249261 | A1* | 9/2015 | Dai | H01M 10/054 429/231.8 |
| 2017/0155133 | A1* | 6/2017 | Lee | H01M 4/62 |
| 2018/0323477 | A1* | 11/2018 | Zhou | H01M 4/134 |
| 2019/0067748 | A1* | 2/2019 | Saeki | H01M 4/13 |
| 2019/0221879 | A1* | 7/2019 | Safanama | H01M 10/0565 |
| 2019/0296305 | A1* | 9/2019 | Ito | H01M 50/443 |
| 2019/0393542 | A1* | 12/2019 | Jang | H01M 10/0566 |
| 2020/0112050 | A1* | 4/2020 | Hu | H01M 50/446 |

OTHER PUBLICATIONS

Written Opinion issued Jun. 11, 2019 in PCT/JP2019/007806 filed on Feb. 28, 2019.

Dey et al., "Inorganic Electrolyte Li/CuCl$_2$ Rechargeable Cell", Journal of Electrochemical Society, vol. 136, No. 6, 1989, pp. 1618-1621.

* cited by examiner

SECONDARY BATTERY, BATTERY PACK, VEHICLE, AND STATIONARY POWER SUPPLY

CROSS-REFERENCE TO RELATED APPLICATION

This application is a Continuation Application of PCT Application No. PCT/JP2019/007806, filed Feb. 28, 2019 and based upon and claiming the benefit of priority from Japanese Patent Application No. 2018-173574, filed Sep. 18, 2018, the entire contents of all of which are incorporated herein by reference.

FIELD

Embodiments of the present invention relate to a secondary battery, a battery pack, a vehicle, and a stationary power supply.

BACKGROUND

Nonaqueous electrolyte batteries, in which a lithium metal, a lithium alloy, a lithium compound, or a carbonaceous material is used as a negative electrode, are expected as high energy density batteries, and research and development is actively in progress. Lithium ion batteries, which include a positive electrode including $LiCoO_2$ or $LiMn_2O_4$ as an active material and a negative electrode including a carbonaceous material allowing lithium ions to be inserted and extracted, have been widely put to practical use for a portable device. In order to advance applications to electric automobiles and stationary storage batteries, improvement of durability life performance, low temperature performance, and safety is required in addition to high energy density and high capacity of secondary batteries. In order to increase the energy density of the secondary batteries, research and development of a battery including a metal negative electrode (for example, Li, Na, Mg, or Al) as a post lithium ion battery, a battery including a sulfur-containing positive electrode, or a battery including an air electrode as a positive electrode has been conducted, but it is difficult to achieve both high energy density and durability life performance.

In a battery including a metal negative electrode, when Li metal is used for the metal negative electrode, there is a problem such as short-circuiting due to dendrite precipitation, and when Mg metal is used for the metal negative electrode, there is a problem that the overvoltage is large and the cycle life performance is short. On the other hand, when the Al metal is used for the negative electrode, since the valence number of the Al metal is trivalent and the density is high, the volume specific capacity of the battery is the largest at 8,042 $mAh/cm^3$ and high capacity is expected. However, since overvoltage of an aluminum ion oxidation-reduction reaction at the negative electrode is large at room temperature and a battery voltage drops, a combination with a high voltage positive electrode is required. In addition, an electrochemical potential window of an electrolytic solution is narrow. For these reasons, practical application of aluminum batteries is difficult. Although sulfur has been studied as a high capacity positive electrode material, since sulfur has no electron conductivity, the charge-discharge rate performance is low, and since sulfur is dissolved in the electrolytic solution, the cycle life performance is short. Hence, sulfur has not been put to practical use.

DETAILED DESCRIPTION

According to one embodiment, a secondary battery includes a positive electrode, a negative electrode and a separator. The positive electrode includes a first electrolyte containing aluminum ions. The negative electrode is capable of allowing lithium ions to be inserted and extracted. The separator is disposed between the positive electrode and the negative electrode. The separator has lithium ion conductivity.

According to another embodiment, a battery pack includes the secondary battery according to the embodiment.

According to another embodiment, a vehicle includes the battery pack or secondary battery according to the embodiment.

According to another embodiment, a stationary power supply includes the battery pack or secondary battery according to the embodiment.

According to the embodiments, provided are a secondary battery and a battery pack having a high energy density and a vehicle and a stationary power supply including the secondary battery or the battery pack.

First Embodiment

According to a first embodiment, a secondary battery including a positive electrode, a negative electrode, and a separator disposed between the positive electrode and the negative electrode is provided. The positive electrode includes a first electrolyte containing aluminum ions. The negative electrode can have lithium ions to be inserted into and extracted from. The separator has lithium ion conductivity.

Figure 2:
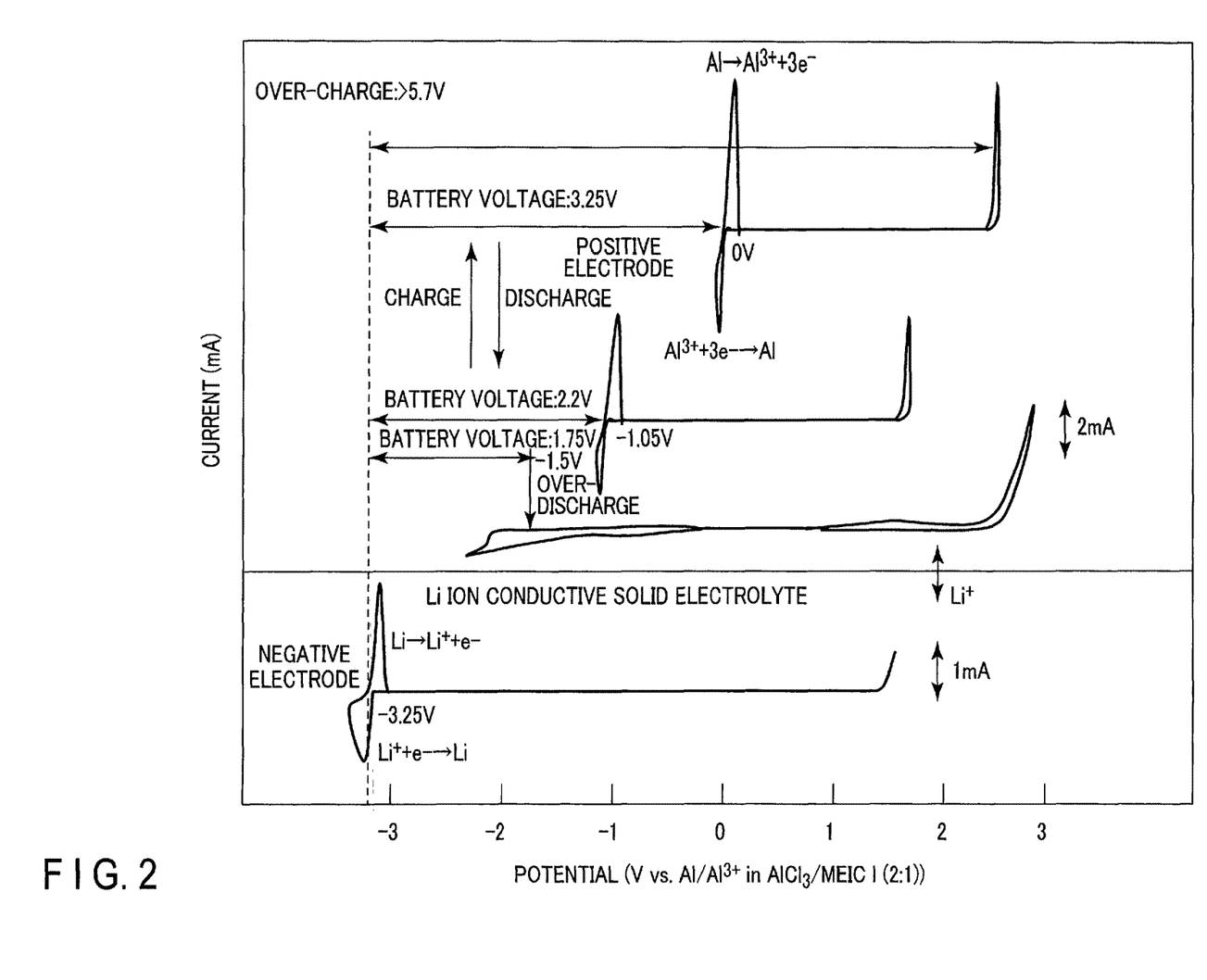
FIG. 2 is a view showing a relationship between potentials and currents of a positive electrode and a negative electrode in a secondary battery according to an embodiment.

By combining the positive electrode, the negative electrode, and the separator, an oxidation-reduction reaction of aluminum was smoothly generated in the positive electrode to realize a secondary battery having high energy density at high voltage and excellent durability. The reaction principle of the secondary battery will be described with reference to FIG. 2 while taking, as an example, a secondary battery including a negative electrode containing at least one kind selected from the group consisting of a lithium metal, a lithium alloy, and a compound capable of allowing lithium ions to be inserted and extracted, a positive electrode con- taining a first electrolyte containing aluminum chloride, and a lithium ion conductive solid electrolyte layer as separator. FIG. 2 shows a charge-discharge potential of each of a positive electrode and a negative electrode when an ionic liquid obtained by mixing $AlCl_3$ and 1-methyl-3-ethylimidazolium chloride (MEICl) at a molar ratio of 2:1 is used as an electrolytic solution, and a W electrode (1 cm²) is used as a working electrode, and a sweep rate is 50 mV/s in a 25° C. thermostatic chamber.

Here, the formal battery charge-discharge reaction of each of the positive electrode and the negative electrode (actually, a reaction of the positive electrode is an oxidation-reduction reaction of aluminum complex ions) is shown below.

Positive electrode reaction in battery discharge reaction:

Positive electrode reaction in battery charge reaction:

Negative electrode reaction in battery discharge reaction:

Negative electrode reaction in battery charge reaction:

When lithium ions are extracted from the negative electrode by the discharge reaction and lithium ions diffuse through the lithium ion conductive solid electrolyte layer and reach the positive electrode, $AiCl_3$ ($Al_2Cl_7^-$) is reduced in the positive electrode and Al and LiCl are generated as a discharge product. At this time, since the positive electrode potential is 0 V (vs. $Al/Al^{3+}$) and the negative electrode potential is −3.25 V (vs. $Al/Al^{3+}$), the battery voltage is 3.25 V. When the discharge reaction proceeds and $AlCl_3$ decreases, the positive electrode potential shifts to a base potential and becomes −1.05 V (vs. $Al/Al^{3+}$), and thus the battery voltage drops to 2.2 V. When the discharge is further continued, the positive electrode potential becomes −1.5 V (vs. $Al/Al^{3+}$), and the battery voltage becomes 1.75 V and becomes an over-discharge state. In the over-discharge state, the $AlCl_3$ concentration in the electrolytic solution decreases and the ionic liquid solidifies. As a result, the over-discharge reaction is stopped.

On the other hand, in the charge reaction, lithium ions are extracted from the positive electrode, and lithium ions migrate to the negative electrode through the solid electrolyte layer. As the charge reaction progresses, the amount of LiCl in the positive electrode decreases. As a result, since the lithium ion conductivity of the positive electrode is lowered, the charge reaction is stopped. Note that chlorine is generated when the charge reaction progresses and the battery voltage exceeds 5.7 V and reaches over-charge. The simplified charge-discharge reaction is shown in Chem. 1 (for example, in the positive electrode, it is represented by the oxidation-reduction reaction of $Al_2Cl_7$— or $AlCl_4$— of aluminum complex ion).

[Chem. 1]

Positive electrode reaction:  (A)

Negative electrode reaction:  (B)

Battery reaction:  (C)

Figure 3:
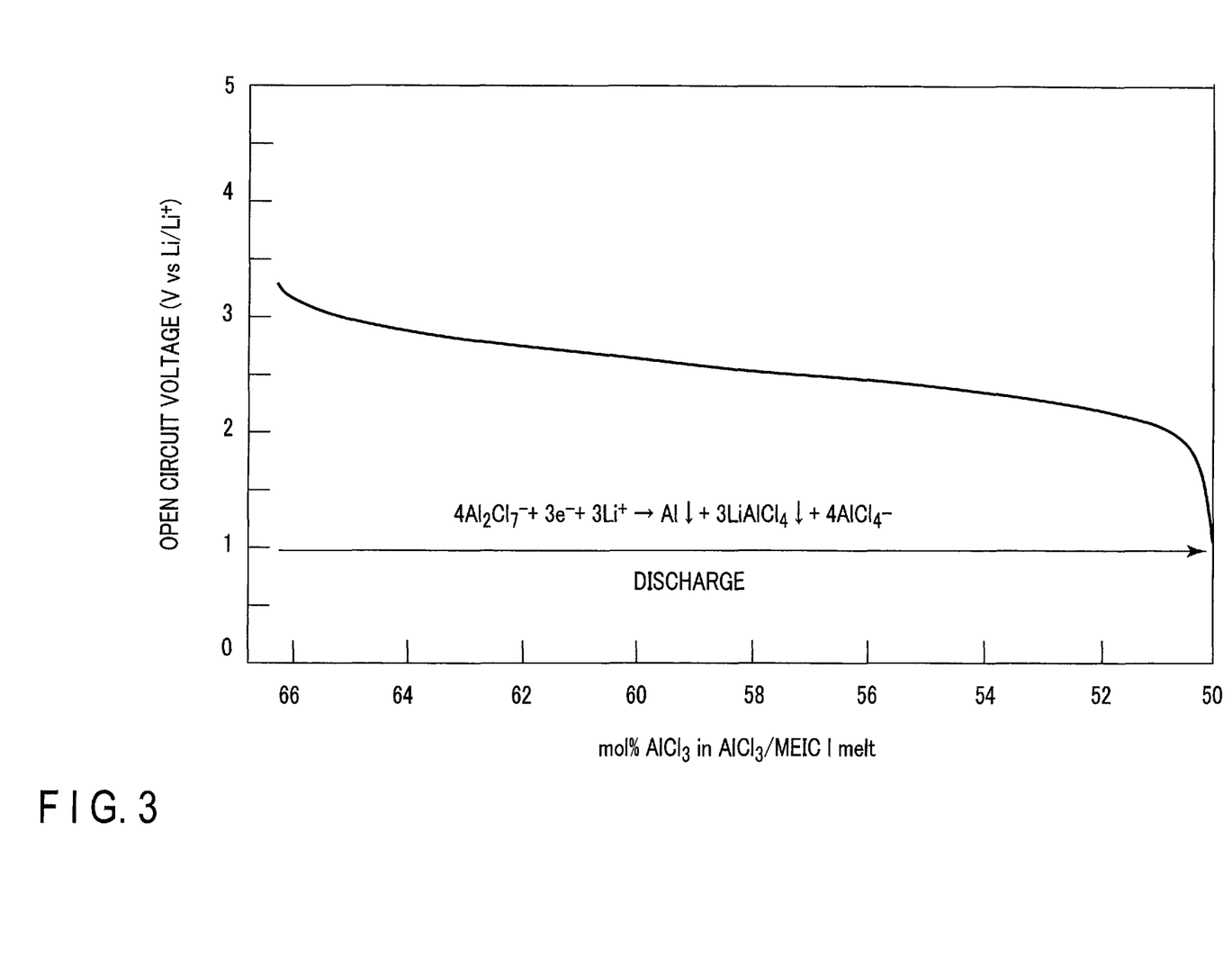
FIG. 3 is a view showing an example of a relationship between an amount of aluminum chloride and an open circuit voltage in a secondary battery according to an embodiment.

A high electromotive force of 3.3 V to 1.7 V can be obtained by such a battery reaction. In addition, FIG. 3 shows a relationship between the aluminum chloride concentration (mol %) in the electrolytic solution of the positive electrode and the open circuit voltage (V vs. Li/Li⁺) of the secondary battery. With progress of the discharge reaction shown in the chemical formula of FIG. 3, the aluminum chloride concentration in the electrolytic solution decreases and the open circuit voltage decreases from about 3.25 V to about 1 V. From FIG. 2 and FIG. 3, it can be said that the electromotive force of the secondary battery can be adjusted by adjusting the composition of the electrolytic solution of the positive electrode. For example, in the case of using an ionic liquid in which $AlCl_3$ and MEICl are mixed at a molar ratio of 67:33 in the electrolytic solution of the positive electrode, an electromotive force of about 3.3 V can be expected. In the case of using an electrolytic solution prepared by mixing 0.25 mol/kg of LiCl with an ionic liquid in which $AlCl_3$ and MEICl are mixed at a molar ratio of 53:47 in the electrolytic solution of the positive electrode, an electromotive force of about 2.2 V can be expected.

According to the secondary battery of the embodiment, since the oxidation-reduction reaction of the dissolution and precipitation of aluminum metal proceeds efficiently and smoothly, the secondary battery having high energy density and excellent durability life performance can be provided.

Figure 1:
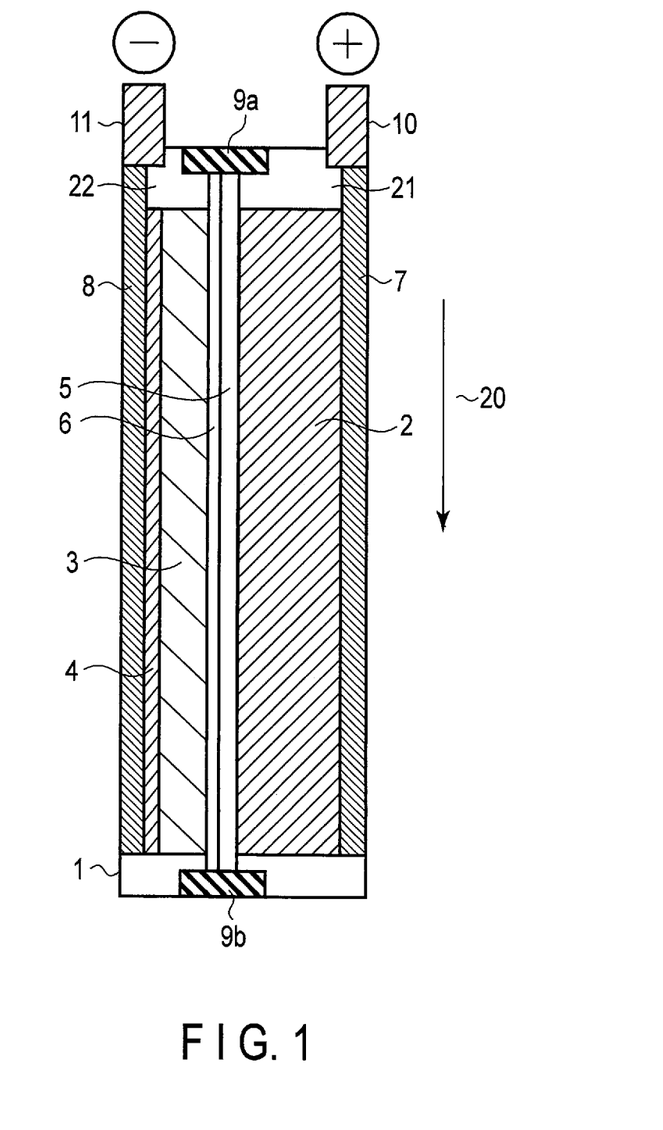
FIG. 1 is a cross-sectional view of a secondary battery according to an embodiment, taken in parallel with a first direction.

An example of the secondary battery is shown in FIG. 1. FIG. 1 shows a cross section of the secondary battery taken along a first direction 20. The secondary battery includes a container member 1, an electrode group housed in the container member 1, a positive electrode lead 7, a negative electrode lead 8, a positive electrode terminal 10, and a negative electrode terminal 11. The container member 1 includes a rectangular cylindrical container provided with a bottom plate on one side, and a lid plate. The opposite side of the bottom plate of the container serves as an opening portion, and the lid plate is fixed to the opening portion by, for example, welding or caulking. The electrode group includes a positive electrode 2, a negative electrode layer 3, a negative electrode current collector 4, a first separator 5, and a second separator 6. The positive electrode 2 and the negative electrode layer 3 are laminated so as to face each other with the first separator 5 and the second separator 6 interposed therebetween. The first direction 20 is a direction orthogonal to the laminating direction. The positive electrode 2 includes a conductive porous body and a first electrolyte (not shown) held in the porous body. The negative electrode layer 3 is a layer that can have lithium ions to be inserted in and extracted from. A second electrolyte (not shown) is held in the negative electrode layer 3 and the second separator 6. The negative electrode current collector 4 is laminated on the principal surface of the negative electrode layer 3 opposite to the principal surface facing the separator. The first separator 5 has lithium ion conductivity. One principal surface of the first separator 5 is opposite to or in contact with the positive electrode 2. One principal surface of the second separator 6 is opposite to or in contact with the negative electrode layer 3. Both end portions of the first separator 5 and the second separator 6 in the first direction 20 protrude from the positive electrode 2 and the negative electrode layer 3. An insulating support 9a is disposed between one end portion of the first separator 5 and the second separator 6 in the first direction 20 and the back surface of the lid plate. In addition, an insulating support 9b is disposed between the other end portion of the first separator 5 and the second separator 6 in the first direction 20 and the bottom surface. The inside of the outer container 1 is partitioned into two spaces by the first separator 5 and the second separator 6. A space (positive electrode space) 21 defined by the first separator 5, the insulating supports 9a and 9b, and the outer container and a space (negative electrode space) 22 defined by the second separator 6, the insulating supports 9a and 9b, and the outer container are present. The first electrolyte in the positive electrode space 21 and the second electrolyte in the negative electrode space 22 do not cross or mix each other, and exist independently of each other.

The positive electrode terminal 10 and the negative electrode terminal 11 are provided on the lid plate with an insulating member (not shown) interposed therebetween. The positive electrode terminal 10 functions as an external positive electrode terminal and the negative electrode terminal 11 functions as an external negative electrode terminal. The positive electrode lead 7 is electrically connected to the positive electrode 2 and positive electrode terminal 10. On the other hand, the negative electrode lead 8 is electrically connected to the negative electrode current collector 4 and negative electrode terminal 11.

According to the secondary battery having the structure shown in FIG. 1, since the first separator 5 and the second separator 6 can function as partition walls, the contact between the first electrolyte and the negative electrode layer 3 can be prevented. The secondary battery may have a structure that can be charged and discharged, and is not limited to the structure shown in FIG. 1. Hereinafter, the members included in the secondary battery will be described.

Positive Electrode

The positive electrode includes a conductive porous body and a first electrolyte that is held in the porous body and contains aluminum ions ($Al^{3+}$, for example, $Al_2Cl_7^-$ or $AlCl_4^-$ as aluminum complex ions).

Since aluminum in the first electrolyte undergoes an oxidation-reduction reaction with lithium ions, the insertion-extraction reaction of lithium ions occurs in the positive electrode.

The first electrolyte contains an aluminum salt and at least one kind selected from the group consisting of an organic solvent, an imidazolium salt, a quaternary ammonium salt, and a lithium salt. The solvent or the salt mixed with the aluminum salt is preferably one capable of obtaining a liquid electrolyte by mixing with the aluminum salt. When the first electrolyte is an ionic liquid, the flame retardancy of the secondary battery is enhanced.

Therefore, the secondary battery is suitable for a stationary power supply. The first electrolyte is not limited to a liquid and may be a gel. The first electrolyte may further contain an alkali salt. Examples of the alkali salt include a lithium salt, alkali salts other than the lithium salt, for example, a sodium salt, a potassium salt, and the like. The kind of the alkali salt can be one kind or two or more kinds.

Examples of the aluminum salt include aluminum halide represented by $AlX_3$ (X is a halogen ion), $Al[FSO_2N]_3$, $Al[CF_3SO_2N]_3$, and $Al[C_2F_5SO_2N]_3$. Preferred examples of the aluminum halide include $AlCl_3$, $AlBr_3$, and $AlI_3$. The aluminum ion forms a complex ion with the halogen ion, and an aluminum chloride anion such as $Al_2Cl_7-$ or $AlCl_4-$ can be contained in the first electrolyte. The kind of the aluminum salt can be one kind or two or more kinds.

In a mixed salt that uses $AlX_3$ as the aluminum salt and uses an imidazolium salt and/or a quaternary ammonium salt (MX), when the molar number of $AlX_3$ is Y1 and the molar number of MX is Y2, the mixed molar ratio represented by Y1/Y2 is preferably in a range of 0.9 to 3. Within this range, the mixed salt becomes liquid at room temperature, the reduction in resistance of charge and discharge of the positive electrode and the high charge-discharge efficiency can be achieved, and the cycle life performance can be improved. A more preferable range of the mixed molar ratio is in a range of 1 to 3. Within this range, the charge-discharge efficiency of the positive electrode can be increased and the cycle life performance can be improved. In addition, the potential of the positive electrode can increase and the capacity of the positive electrode can increase.

The imidazolium salt contains an alkylimidazolium ion having a framework represented by Chem. 2 below and an anion forming a pair thereof. The kind of the imidazolium salt can be one kind or two or more kinds.

[Chem 2.]

Formula (1)

Examples of the alkylimidazolium ion include a dialkylimidazolium ion, a trialkylimidazolium ion, and a tetraalkylimidazolium ion. Examples of the dialkylimidazolium include 1-methyl-3-ethylimidazolium ion ($MEI^+$). Examples of the trialkylimidazolium ion include 1,2-diethyl-3-propylimidazolium ion ($DMPI^+$). Examples of the tetraalkylimidazolium ion include 1,2-diethyl-3,4(5)-dimethylimidazolium ion.

The quaternary ammonium salt contains a quaternary ammonium ion and an anion forming a pair thereof. The kind of the quaternary ammonium salt can be one kind or two or more kinds. Examples of the quaternary ammonium ion include a tetraalkylammonium ion and a cyclic ammonium ion. Examples of the tetraalkylammonium ion include a dimethylethylmethoxyethylammonium ion, a dimethylethylmethoxymethylammonium ion, a dimethylethylethoxyethylammonium ion, and a trimethylpropylammonium ion ($TMPA^+$).

Examples of the lithium salt include LiCl, $LiPF_6$, $LiBF_4$, $LiClO_4$, $Li[(FSO_2)_2N]$, $Li[(CF_3SO_2)_2N]$, and $Li[(C_2F_5SO_2)_2N]$. The kind of the lithium salt can be one kind or two or more kinds.

Examples of the anion contained in the first electrolyte include a halogen ion such as $Cl^-$, $Br^-$, or $I^-$, $BF_4^-$, $PF_6^-$, $AsF_6^-$, $ClO_4^-$, $CF_3SO_3—$, $CF_3COO^-$, $CH_3CO—$, $CO_{32}^-$, $[(FSO_2)_2N]—$, $[(CF_3SO_2)_2N]—$, $[(C_2F_6SO_2)_2N]—$, and $(CF_3SO_2)_3C—$. The kind of the anion can be one kind or two or more kinds.

Examples of the organic solvent include acetonitrile, propionitrile, methoxyacetonitrile, 3-methoxypropionitrile, alkylsulfone, N-methylacetamide, γ-butyrolactone, and propylene carbonate. Examples of the alkylsulfone include dimethylsulfone, diethylsulfone, methylethylsulfone, and dipropylsulfone. Among them, the dipropylsulfone is preferable since the dipropylsulfone has a low melting point. The first electrolyte containing alkylsulfone is suitable for use in a high temperature environment or in heating the secondary battery. The kind of the organic solvent may be one kind or two or more kinds.

The first electrolyte preferably includes an ionic liquid containing a cation containing one or more selected from an alkylimidazolium ion, a quaternary ammonium ion, and a lithium ion and an anion forming a pair thereof.

The first electrolyte containing an alkylimidazolium ion and/or a quaternary ammonium ion (particularly a tetraalkylammonium ion) can lower a melting point. Furthermore, since the first electrolyte has high electrochemical stability, the reactivity of the charge-discharge reaction at the positive electrode can be lowered. Therefore, the cycle life performance can be improved. Although the concentration of lithium ions as the cation of the first electrolyte increases with progress of discharge, lithium ions may be previously present in the first electrolyte before discharge. In addition, as the discharge reaction progresses, the lithium salt may be present in the first electrolyte in a supersaturated state. Furthermore, in the over-discharged state, the ion conductivity of the ionic liquid decreases and solidifies due to a decrease in the lithium ion concentration and the aluminum ion concentration in the positive electrode. As a result, the over-discharge reaction is stopped and the over-discharge deterioration of the positive electrode is suppressed. On the other hand, in the over-charge reaction, since lithium ions in the positive electrode are depleted, ion conduction in the lithium ion conductive separator does not occur and the over-charge reaction is stopped. Therefore, the deterioration of the positive electrode due to the over-charge reaction is suppressed. With such a reaction mechanism, the durability of the secondary battery due to over-charge reaction and over-discharge reaction can be greatly improved.

The porous body is not particularly limited as long as the porous body can hold the first electrolyte. Holes of the porous body may be through-holes or non-through-holes. In addition, the porous body may be one in which holes are arranged two-dimensionally or arranged three-dimensionally. Examples of the porous body include a porous body having a structure in which fibrous frameworks are arranged two-dimensionally or three-dimensionally, a nonwoven fabric, a porous body having a sponge shape, a porous body having a mesh shape and a metal foil having an opening. For the porous body, one kind may be used alone, or two or more kinds may be used in combination.

The porous body is preferably formed from a conductive material. Examples of the conductive material include a metal, such as aluminum, and a carbon material. The kind of the conductive material can be one kind type or two or more kinds. The conductive porous body functions as a positive electrode current collector.

The porosity of the porous body is preferably 50% to 98%.

A preferable porous body is an aluminum porous body. Therefore, the utilization rate of the precipitation-dissolution reaction of aluminum at the positive electrode in the charge-discharge reaction is improved, and the charge-discharge rate performance and the effective capacity of the positive electrode can be improved. In particular, the aluminum porous body preferably has a porosity of 50% to 98%.

In order to improve the electronic network, the positive electrode preferably contains a carbon body such as carbon nanofibers as the conductive agent.

The thickness of the positive electrode changes according to the electrode shape and application. In a case where the structure of the electrode group is the laminated structure or the wound structure, when the thickness of the positive electrode is in a range of 30 µm to 200 µm, it is suitable for high output applications, and when the thickness of the positive electrode is in a range of 200 µm to 1,000 µm, it is suitable for high energy applications.

Negative Electrode

The negative electrode can allow lithium ions to be inserted in and extracted from.

The negative electrode includes a negative electrode layer and a negative electrode current collector that is in contact with the negative electrode layer or supports the negative electrode layer.

The negative electrode layer contains at least one kind selected from the group consisting of a lithium metal, a lithium alloy, and compounds capable of allowing lithium ions to be inserted in and extracted from. Examples of the lithium alloy include Li—Al, Li—Si, and Li—Zn. Examples of the compounds capable of allowing lithium ions to be inserted in and extracted from include graphite, a carbonaceous material, and a carbon body. Among the compounds capable of allowing lithium ions to be inserted in and extracted from, those containing no lithium at the time of synthesis are preferably incorporated with lithium. Therefore, the initial charge and discharge can be started from the discharge.

The negative electrode layer may contain a conductive agent and/or a binder.

As the conductive agent, a carbon material, a metal compound powder, a metal powder, or the like can be used. Examples of the carbon material can include acetylene black, carbon black, coke, carbon fiber, graphite, and carbon nanotube. The BET specific surface area due to $N_2$ adsorption of the carbon material is preferably 10 m$^2$/g or more. Examples of the metal compound powder include powders of TiO, TiC, and TiN. Examples of the metal powder include powders of Al, Ni, Cu, and Fe. Preferable examples of the conductive agent include coke having a heat treatment temperature of 800° C. to 2,000° C. and having an average particle size of 10 m or less, graphite, acetylene black, a carbon fiber having an average fiber diameter of 1 m or less, and TiO powder. According to one or more selected from these, the electrode resistance can be reduced and the cycle life performance can be improved. The kind of the conductive agent can be one kind or two or more kinds.

Examples of the binder include polytetrafluoroethylene (PTFE), polyvinylidene fluoride (PVdF), fluororubber, acrylic rubber, styrene butadiene rubber, core shell binder, polyimide, and carboxymethyl cellulose (CMC). The kind of the binder may be one kind or two or more kinds.

When a lithium metal or a lithium alloy is used, the negative electrode layer can be layers of the lithium metal and/or the lithium alloy. Specific examples of these layers are a lithium metal foil and a lithium alloy foil.

The negative electrode layer containing the compound capable of allowing lithium ions to be inserted in and extracted from (hereinafter referred to as the first compound) is produced, for example, by suspending the first compound, the conductive agent, and the binder in an appropriate solvent, applying the suspension to the current collector, and performing drying and pressing. The compounding ratio of the first compound, the conductive agent, and the binder is preferably in a range of 80% by weight to 95% by weight of the first compound, 3% by weight to 18% by weight of the conductive agent, and 2% by weight to 7% by weight of the binder.

Examples of the negative electrode current collector include a foil and a mesh. Examples of the material for forming the negative electrode current collector can include a metal such as copper or nickel, and an alloy such as a copper alloy or a nickel alloy. The thickness of the negative electrode current collector can be in a range from 10 µm to 500 µm. The negative electrode current collector can be electrically connected to the negative electrode terminal through the lead.

The thickness of the negative electrode changes according to the electrode shape and application. In a case where the structure of the electrode group is the laminated structure or the wound structure, when the thickness of the negative electrode is in a range of 30 µm to 100 µm, it is suitable for high output applications, and when the thickness of the negative electrode is in a range of 100 µm to 500 µm, it is suitable for high energy applications.

The capacity of the negative electrode is preferably equal to or greater than the capacity of the positive electrode.

First Separator

The first separator has lithium ion conductivity. Preferably, the first separator selectively transmits lithium ions.

Preferably, the first separator is disposed between the positive electrode and the negative electrode layer, and one principal surface faces or is in contact with the positive electrode. Therefore, since the effect of suppressing the aluminum ions of the positive electrode, the cation other than lithium ions, and the anion from reaching the negative electrode can be enhanced, the charge-discharge reaction efficiency of the positive electrode can be enhanced.

The first separator can be a layer containing a lithium ion conductive solid electrolyte. The lithium ion conductive solid electrolyte can be an oxide, a sulfide, a phosphorus oxide, or a polymer. In addition to the solid electrolyte having lithium ion conductivity, the first separator may further contain an inorganic material and/or an organic material. The material constituting the first separator can be one kind or two or more kinds.

The first separator may contain a porous body made of a polymer or an inorganic material and a gel or solid lithium ion conductive electrolyte held in the porous body.

The first separator can selectively transmit lithium ions and cannot transmit cations other than aluminum ions and lithium ions, and anionic species.

Examples of the lithium ion conductive solid electrolyte include an oxide solid electrolyte having a garnet structure and a lithium phosphate solid electrolyte having a NASICON structure. These have high lithium ion conductivity. The kind of the solid electrolyte may be one kind or two or more kinds.

The oxide solid electrolyte having the garnet structure has an advantage in that reduction resistance is high and an electrochemical window is wide. Examples of the oxide solid electrolyte having the garnet structure include $La_{5+x}A_xLa_{3-x}M_2O_{12}$ (A is at least one element selected from the group consisting of Ca, Sr, and Ba, M is at least one element selected from Nb and Ta, $0 \leq x \leq 0.5$), $Li_3M_{2-x}L_2O_{12}$ (M is at least one element selected from Nb and Ta, L is Zr, $0 \leq x \leq 0.5$), $Li_{7-3x}Al_xLa_3Zr_3O_{12}$ ($0 \leq x \leq 0.5$), and $Li_7La_3Zr_2O_{12}$. Since $Li_{6.25}A_{0.25}La_3Zr_3O_{12}$ and $Li_7La_3Zr_2O_{12}$ have high ion conductivity and are electrochemically stable, the secondary battery having excellent discharge performance and cycle life performance can be realized.

Examples of the lithium phosphate solid electrolyte having a NASICON structure include a solid electrolyte represented by $Li_{1+x}Ml_2(PO_4)_3$ (Ml is at least one element selected from the group consisting of Ti, Ge, Sr, Zr, Sn, and Al, $0 \leq x \leq 0.5$). $Li_{1+x}Al_xGe_{2-x}(PO_4)_3$ ($0 \leq x \leq 0.5$), $Li_{1+x}Al_xZr_{2-x}(PO_4)_3$ ($0 \leq x \leq 0.5$), and $Li_{1+x}Al_xTi_{2-x}(PO_4)_3$ ($0 \leq x \leq 0.5$) have high ion conductivity and high electrochemical stability, and hence are preferable.

The thickness of the first separator can be in a range of 30 m to 200 µm. Within this range, the separator having high mechanical strength and low ion conduction resistance can be realized.

Second Separator

The second separator includes a porous layer. In the porous layer, a liquid or gel second electrolyte containing lithium ions can be held.

Preferably, the second separator is disposed between the positive electrode and the negative electrode layer, and one principal surface faces or in contact with the negative electrode layer. Therefore, it is possible to reduce the resistance of the interface between the negative electrode layer and the separator. In particular, it contributes to reducing the interfacial resistance of the lithium metal and the lithium alloy. Therefore, the negative electrode charge-discharge reaction can be made to proceed uniformly by arranging the second separator as described above, high coulomb efficiency can be obtained, and the cycle life performance can be improved. The negative electrode layer may include a second electrolyte. Therefore, the lithium ion conductivity of the negative electrode can be increased.

Examples of the porous layer include a porous membrane, a nonwoven fabric, and a porous film. Examples of the material for forming the porous layer can include polyolefin such as polyethylene or polypropylene, and cellulose. For the porous layer, one kind may be used alone, or two or more kinds may be used in combination.

The porosity of the porous layer is preferably 50% or more, more preferably 60% or more, and further preferably 62% or more. In addition, the lower limit value can be set to 80%.

The second electrolyte may include an organic solvent and a lithium salt dissolved in the organic solvent.

Examples of the lithium salt include LiCl, $LiPF_6$, $LiBF_4$, $LiClO_4$, $Li[(FSO_2)_2N]$, $Li[(CF_3SO_2)_2N]$, and $Li[(C_2F_5SO_2)_2N]$. The kind of the lithium salt may be one kind or two or more kinds.

The lithium salt concentration in the organic solvent can be in a range of 1 mol/L to 3 mol/L.

Examples of the organic solvent include cyclic carbonates such as propylene carbonate (PC) or ethylene carbonate (EC), chain carbonates such as dimethyl carbonate, dimethoxyethane (DME), diethoxyethane (DEE), tetrahydrofuran (THF), 2-methyltetrahydrofuran (2Me-THF), fluorinated cyclic carbonate (for example, fluorinated ethylene carbonate), fluorinated chain carbonate (for example, fluorinated ethyl methyl carbonate), and fluorinated ether. As the organic solvent, one kind may be used alone, or a mixed solvent in which two or more kinds are mixed may be used. The second electrolyte containing at least one kind selected from the group consisting of fluorinated cyclic carbonate, fluorinated chain carbonate, and fluorinated ether is excellent in flame retardancy.

The second electrolyte is preferably a nonaqueous electrolyte having low reactivity with lithium metal and high reduction resistance. The second electrolyte including one of the organic solvents and one of the lithium salts can reduce the reactivity with the lithium metal and increase the reduction resistance.

The second electrolyte may be in a liquid form or a gel form. Examples of the polymer for gelling the electrolytic solution include polyacrylonitrile (PAN), polyethylene oxide (PEO), polyvinylidene fluoride (PVdF), and polymethyl methacrylate. The gel polymer electrolyte including polyacrylonitrile is preferable because it has high ion conductivity and improves discharge performance and low temperature performance.

In addition, the second electrolyte can contain an ionic liquid having a composition with an aluminum ion concentration of 50 mol % or less, instead of the organic solvent. The ionic liquid is preferably in a liquid state in the presence of the lithium salt.

The thickness of the second separator can be in a range of 1 μm to 20 μm. Within this range, the separator having high mechanical strength and low ion conduction resistance can be realized.

The total thickness of the first separator and the second separator can be in a range of 10 μm to 150 μm. The second separator is not essential. However, the charge-discharge reaction of the negative electrode having the negative electrode layer containing the lithium metal and/or the lithium alloy is made to progress uniformly by disposing the first separator and the second separator between the positive electrode and the negative electrode layer, thereby achieving high coulomb efficiency and improving cycle life performance.

Container Member

The container member includes a container having an opening portion, and a lid attached to the opening portion of the container. The lid may be a member separate from the container, or may be integrated with the container. In addition, the container member is not limited to the structure shown in FIG. 1 as long as the container member can house the positive electrode, the negative electrode, the separator, and the electrolyte. A container member having a shape corresponding to a rectangular, thin, cylindrical, or coin-shaped battery can be used.

A material constituting the container member include a metal, a laminate film, and the like.

Examples of the metal include iron, stainless steel, aluminum, and nickel. In the case of using a metal can in the container, the thickness of the container is preferably 0.5 mm or less, and more preferably 0.3 mm or less.

Examples of the laminate film can include a multilayer film in which an aluminum foil or a stainless steel foil is coated with a resin film. As the resin, polymers such as polypropylene (PP), polyethylene (PE), nylon, polyethylene terephthalate (PET), and the like can be used. In addition, the thickness of the laminate film is preferably 0.2 mm or less.

According to the secondary battery of the first embodiment, since the positive electrode containing the first electrolyte containing aluminum ions, the negative electrode capable of having lithium ions to be inserted into and extracted from, and the separator having lithium ion conductivity are included, it is possible to provide the secondary battery that performs the charge and discharge with high coulomb efficiency, has high energy density, and is excellent in cycle life performance and durability performance. In addition, since the weight of the secondary battery can be reduced by using aluminum, it is suitable for a stationary power supply and space application.

Second Embodiment

According to a second embodiment, a battery pack is provided. The battery pack includes the secondary battery according to the first embodiment. The battery pack includes one secondary battery according to the first embodiment, or may include a battery module with plural secondary batteries.

The battery pack according to the second embodiment may further include a protective circuit. The protective circuit has a function of controlling the charge and discharge of the secondary battery. Alternatively, a circuit included in a device (for example, an electronic device or an automobile) using the battery pack as a power source may be used as the protective circuit of the battery pack.

In addition, the battery pack according to the second embodiment may further include an external power distribution terminal. The external power distribution terminal is configured to output current from the secondary battery to the outside and/or to input current from the outside to the secondary battery. In other words, when the battery pack is used as the power source, the current is supplied to the outside through the external power distribution terminal. In addition, when the battery pack is charged, the charge current (including regenerative energy of motive force of an automobile or the like) is supplied to the battery pack through the external power distribution terminal.

Next, an example of battery pack according to the second embodiment is explained with reference to the drawings.

Figure 4:
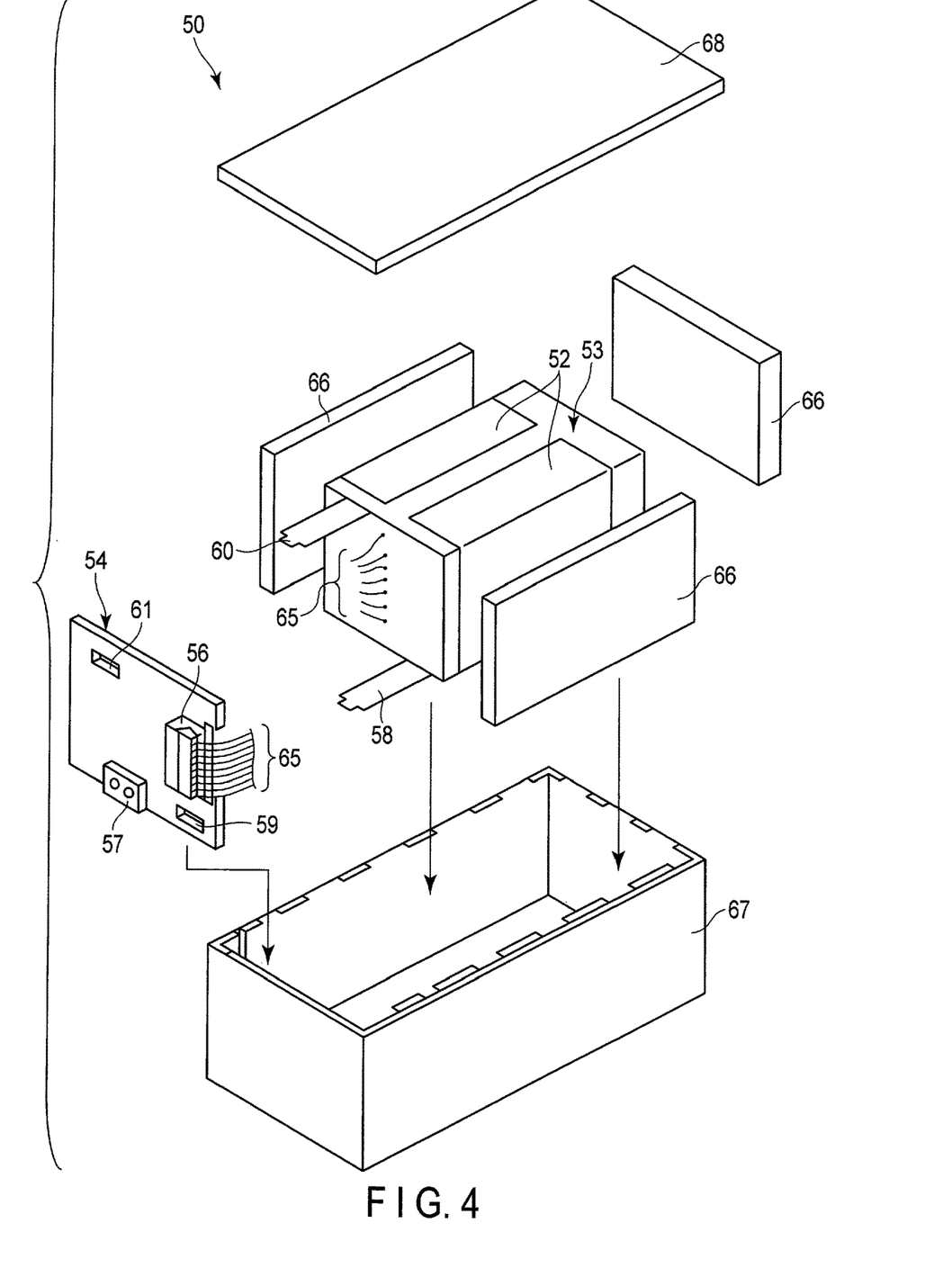
FIG. 4 is an exploded perspective view schematically showing an example of a battery pack according to an embodiment.
Figure 5:
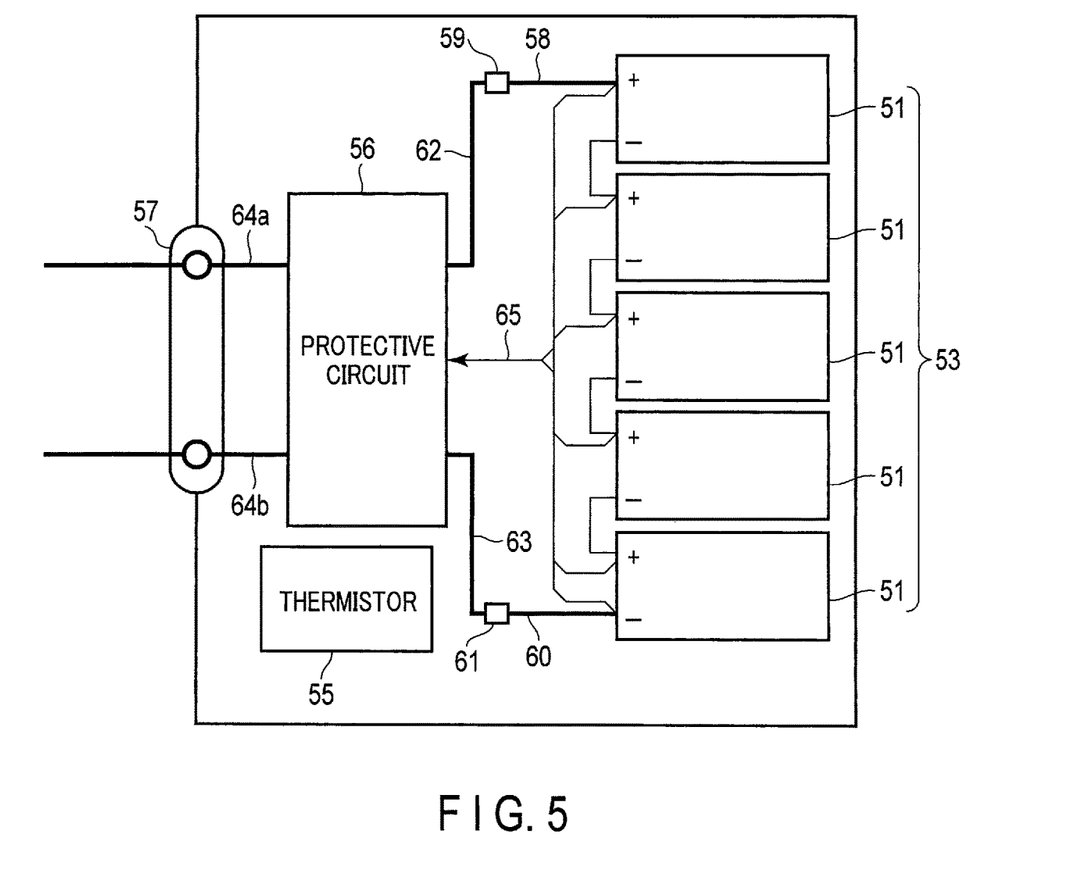
FIG. 5 is a block diagram showing an example of an electric circuit of the battery pack shown in FIG. 4.

FIG. 4 is an exploded perspective view schematically showing an example of the battery pack disassembled for each part according to the second embodiment. FIG. 5 is a block diagram showing an example of an electric circuit of the battery pack shown in FIG. 4.

FIGS. 4 and 5 show an example of a battery pack 50. The battery pack 50 shown in FIGS. 4 and 5 includes single batteries 51. Plural single batteries 51 are stacked so that the negative electrode terminals and the positive electrode terminals extended outside are arranged in the same direction, and fastened with an adhesive tape 52 to configure a battery module 53. The single batteries 51 are electrically connected to each other in series as shown in FIG. 5.

A printed wiring board 54 is arranged to face the side plane of the single battery 51 where the negative electrode terminal and the positive electrode terminal extend out from. A thermistor 55, a protective circuit 56, and a power distribution terminal 57 to an external device as the external power distribution terminal are mounted on the printed wiring board 54 as shown in FIG. 5. An electric insulating plate (not shown) is attached to the surface of the printed wiring board 54 facing the battery module 53 to avoid unnecessary connection of the wires of the battery module 53.

A positive electrode-side lead 58 is connected to the positive electrode terminal located at the bottom layer of the battery module 53 and the distal end of the lead 58 is inserted into a positive electrode-side connector 59 of the printed wiring board 54 so as to be electrically connected.

A negative electrode-side lead 60 is connected to the negative electrode terminal located at the top layer of the battery module 53 and the distal end of the lead 60 is inserted into an negative electrode-side connector 61 of the printed wiring board 54 so as to be electrically connected. The connectors 59 and 61 are connected to the protective circuit 56 through wires 62 and 63 formed on the printed wiring board 54.

The thermistor 55 detects the temperature of the single batteries 51, and the detection signal is sent to the protective circuit 56. The protective circuit 56 can shut down a plus-side wire 64a and a minus-side wire 64b between the protective circuit 56 and the power distribution terminal 57 to an external device under a predetermined condition. The predetermined condition indicates, for example, the case where the temperature detected by the thermistor 55 becomes a predetermined temperature or more. Another example of the predetermined condition indicates the case where the over-charge, over-discharge, or over-current of the single batteries 51 is detected. The detection of the over-charge and the like is performed on each of the single batteries 51 or the entire battery module 53. When each of the single batteries 51 is detected, the battery voltage may be detected, or a positive electrode or negative electrode potential may be detected. In the latter case, a lithium electrode to be used as a reference electrode is inserted into each of the single batteries 51. In the case of the battery pack of FIGS. 4 and 5, wires 65 for voltage detection are connected to each of the single batteries 51. Detection signals are sent to the protective circuit 56 through the wires 65.

Protective sheets 66 made of rubber or resin are arranged on three side planes of the battery module 53 except the side plane from which the positive electrode terminal and the negative electrode terminal protrude out from.

The battery module 53 is housed in a housing container 67 together with each of the protective sheets 66 and the printed wiring board 54. That is, the protective sheets 66 are arranged on both internal surfaces in a long side direction and on one internal surface in a short side direction of the housing container 67. The printed wiring board 54 is arranged on another internal surface in a short side direction. The battery module 53 is located in a space surrounded by the protective sheets 66 and the printed wiring board 54. A lid 68 is attached to the upper surface of the housing container 67.

In order to fix the battery module 53, a heat-shrinkable tape may be used in place of the adhesive tape 52. In this case, the battery module is bound by placing the protective sheets on the both sides of the battery module, revolving the heat-shrinkable tape, and thermally shrinking the heat-shrinkable tape.

In FIGS. 4 and 5, the form in which the single batteries 51 are connected in series is shown. However, in order to increase the battery capacity, the batteries may be connected in parallel. Alternatively, the batteries may be formed by combining series connection and parallel connection. The assembled battery pack can be connected in series or in parallel.

The battery pack shown in FIGS. 4 and 5 includes one battery module. The battery pack according to the embodiments may include a plurality of battery modules. The plurality of battery modules are electrically connected in series, in parallel, or in a combination of series connection and parallel connection.

The form of the battery pack is appropriately changed in accordance with the application purpose. The battery pack according to the embodiment is preferably used for an application purpose requiring that excellent cycle performance is obtained at the time of a large current discharging. More specifically, the battery pack is used as a power supply for a digital camera, a battery for a vehicle such as a two- or four-wheeled hybrid electronic automobile, a two- or four-wheeled electronic automobile, an electric bicycle, or a railway vehicle (for example, an electric train), or a stationary battery. Especially, the battery pack is preferably used as an onboard battery installed in a vehicle. In particular, the battery pack is suitably used as a large-sized storage battery for a stationary power storage system or an in-vehicle battery for vehicles.

The battery pack according to the second embodiment includes the secondary battery according to the first embodiment. Therefore, the battery pack according to the second embodiment has high energy density and is excellent in cycle life performance and durability performance.

Third Embodiment

According to a third embodiment, a vehicle is provided. The vehicle includes the battery pack according to the second embodiment.

In the vehicle according to the third embodiment, the battery pack is configured to, for example, to recover regenerative energy of motive force of the vehicle. The vehicle may include a mechanism configured to convert kinetic energy of the vehicle into regenerative energy.

Examples of the vehicle include a two-wheeled or four-wheeled hybrid electric automobile, a two-wheeled or four-wheel electric automobile, a power-assisted bicycle, and a railway car.

The installation position of the battery pack in the vehicle is not particularly limited. For example, when installing the battery pack on an automobile, the battery pack can be installed in the engine compartment of the vehicle, in rear parts of the vehicle body, or under seats.

The vehicle may include plural battery packs. In this case, the battery packs may be electrically connected in series, connected in parallel, or connected in a combination of in series connection and in parallel connection.

Next, an example of a vehicle according to a third embodiment is explained with reference to the drawings.

Figure 6:
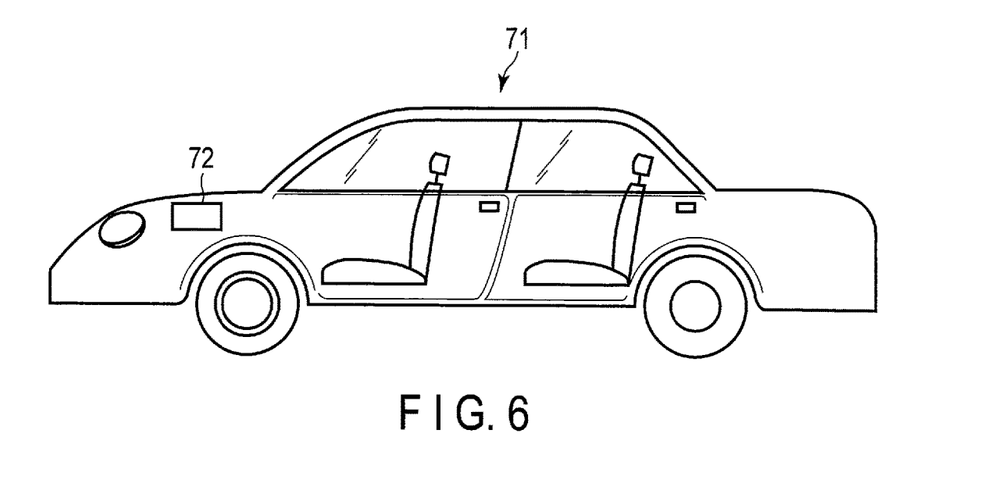
FIG. 6 is a cross-sectional view schematically showing an example of a vehicle according to an embodiment.

FIG. 6 is a cross-sectional view schematically showing an example of a vehicle according to a third embodiment.

The vehicle 71 shown in FIG. 6 includes a vehicle body and a battery pack 72. The battery pack 72 may be the battery pack according to the second embodiment. In the example shown in FIG. 6, the vehicle 71 is a four-wheeled automobile.

The vehicle 71 may include plural battery packs 72. In this case, the battery packs 72 may be connected in series, may be connected in parallel, or may be connected by a combination of in-series connection and in-parallel connection.

In FIG. 6, the battery pack 72 is installed in an engine compartment located at the front of the vehicle body. As described above, the battery pack 72 may be installed in rear parts of the vehicle body, or under seats. The battery pack 72 may be used as a power source of the vehicle. In addition, the battery pack 72 can recover regenerative energy of motive force of the vehicle.

The vehicle according to the third embodiment includes the battery pack according to the second embodiment.

Therefore, according to the present embodiment, it is possible to provide the vehicle including the battery pack that has high energy density and is excellent in cycle life performance and durability performance.

Fourth Embodiment

According to a fourth embodiment, a stationary power supply is provided. The stationary power supply includes the battery pack according to the second embodiment. Note that the stationary power supply may include the secondary battery or the battery module, instead of the battery pack according to the second embodiment.

Figure 7:
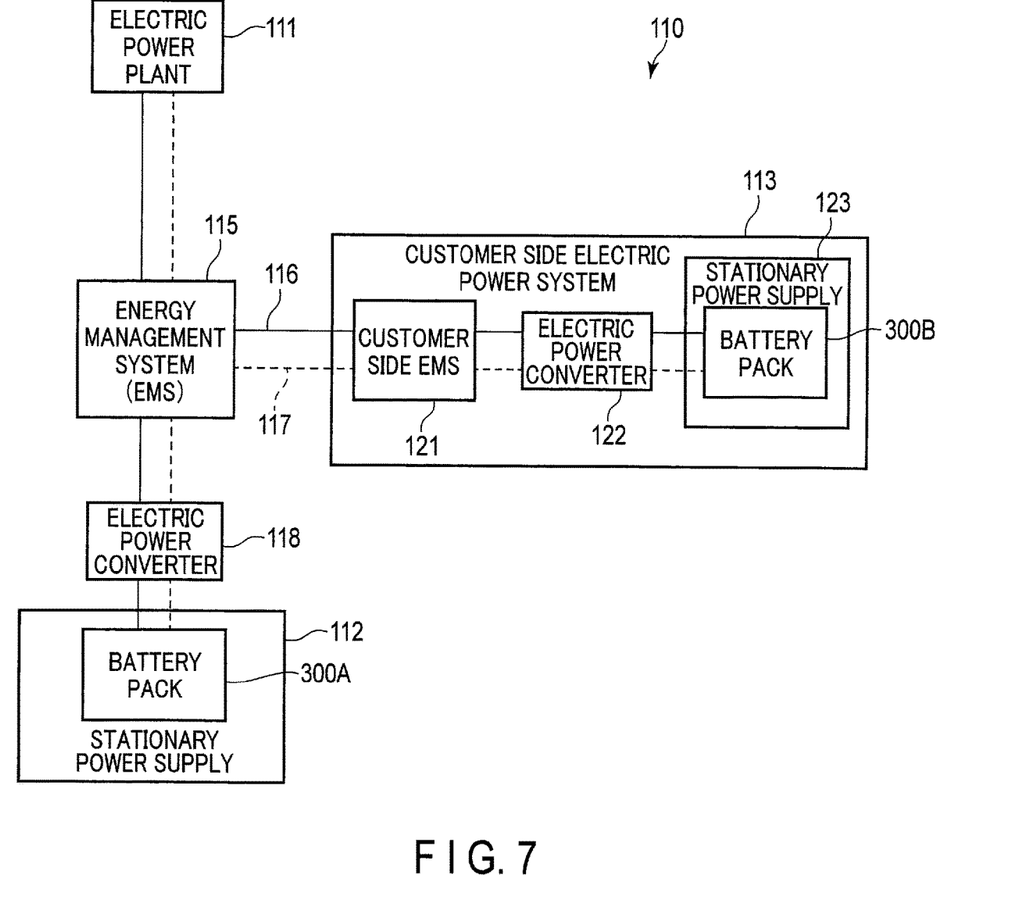
FIG. 7 is a block diagram showing an example of a system including a stationary power supply according to an embodiment.

FIG. 7 is a block diagram showing an example of a system including a stationary power supply according to the fourth embodiment. FIG. 7 is a diagram showing an application example to stationary power supplies 112, 123 as an example of use of battery packs 300A, 300B according to the second embodiment. In the example shown in FIG. 7, a system 110 in which the stationary power supplies 112, 123 are used is shown. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel sources such as thermal power or nuclear power. Electric power is supplied from the electric power plant 111 through the electric power network 116 and the like. In addition, the battery pack 300A is installed in the stationary power supply 112. The battery pack 300A can store electric power and the like supplied from the electric power plant 111. In addition, the stationary power supply 112 can supply the electric power stored in the battery pack 300A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 300A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 300B is installed in the stationary power supply 123. The customer side EMS 121 performs control to stabilize the customer side electric power system 113.

Electric power from the electric power plant 111 and electric power from the battery pack 300A are supplied to the customer side electric power system 113 through the electric power network 116. The battery pack 300B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like.

Therefore, the electric power converter 122 can convert electric power supplied to the customer side electric power system 113 into electric power that can be stored in the battery pack 300B.

Note that the electric power stored in the battery pack 300B can be used, for example, for charging a vehicle such as an electric vehicle. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

The stationary power supply according to the fourth embodiment includes the battery pack according to the second embodiment. Therefore, according to the present embodiment, it is possible to provide the stationary power supply including the battery pack that has high energy density and is excellent in cycle life performance and durability performance.

EXAMPLES

Hereinafter, examples will be described in detail with reference to the drawings, but embodiments of the present invention are not limited to the examples described below.

Example 1

As a first electrolyte that is an electrolyte of a positive electrode, $AlCl_3$, 1-methyl-3-ethylimidazolium chloride (MEICl), and LiCl were mixed at a molar ratio of 2:0.9:0.1 to prepare an ionic liquid (molten salt). An aluminum porous body having a porosity of 80% and a thickness of 300 μm was prepared as a positive electrode current collector, and the positive electrode current collector was impregnated with the first electrolyte and held. As a positive electrode lead, an aluminum current collector foil having a thickness of 10 μm was electrically bonded to the positive electrode current collector to prepare a positive electrode.

As a negative electrode layer, a lithium metal foil having a thickness of 200 μm was pressed to a negative electrode current collector made of a copper foil having a thickness of 10 μm to prepare a negative electrode. The capacity of the lithium metal was set to 4 times the capacity of the positive electrode.

As a first separator, a lithium ion conductive solid electrolyte plate made of $Li_{1.3}Al_{0.3}Ti_{1.7}(PO_4)$ a having a thickness of 50 μm was prepared. In addition, as a second separator, a porous membrane made of polyethylene (PE) having a thickness of 10 μm and a porosity of 60% was prepared. Furthermore, as a second electrolyte, 1 mol/L of a lithium salt of $LiPF_6$ was dissolved in a solvent in which ethylene carbonate (EC) and diethoxyethane (DEE) were mixed at a volume ratio of 1:1 to prepare a nonaqueous electrolytic solution.

Of the principal surfaces of the positive electrode, the first separator was arranged on one principal surface opposite to the other principal surface to which the positive electrode lead was connected. On the other hand, of the principal surfaces of the negative electrode layer, the second separator was arranged on one principal surface opposite to the other principal surface that is in contact with the negative electrode current collector, and the second separator was impregnated with the second electrolyte. An electrode group was obtained by laminating the positive electrode, the first separator, the second separator, and the negative electrode in this order. Both end portions of the first separator and the second separator facing each other protruded from the positive electrode and the negative electrode in a direction orthogonal to the laminating direction. Therefore, the contact between the first electrolyte of the positive electrode and the negative electrode layer is suppressed.

A thin secondary battery having the structure shown in FIG. 1 was produced by inserting the electrode group into a stainless steel container having a thickness of 0.1 mm from the opening portion and arranging an insulating member, a lid plate, and the like. The size of the secondary battery was 1 mm×52 mm×52 mm. In addition, the energy density per weight at the time of 50 mA discharge of the secondary battery was 310 Wh/kg, the energy density per volume was 770 Wh/L, and the high energy density was obtained.

Examples 2 to 14

A thin secondary battery was produced in the same manner as described in Example 1, except that the positive electrode, the first electrolyte of the positive electrode, the first separator, the second separator, and the negative electrode were configured as shown in Tables 1 and 2. Example 14 has the same configuration as that of Example 1. Li-graphite in the table is obtained by inserting lithium into the negative electrode layer formed from graphite before the first discharge. When the thickness ratio (T1:T2) is 9:1, the thickness of the first separator is 90 μm and the thickness of the second separator is 10 μm.

Example 15

A thin secondary battery was produced in the same manner as described in Example 1, except that a carbon porous body having a porosity of 80% and a thickness of 300 μm was used as the positive electrode current collector, instead of the aluminum porous body.

Example 16

A thin secondary battery was produced in the same manner as described in Example 1, except that as a second electrolyte, 1 mol/L of a lithium salt of $Li[(CF_3SO_2)_2N]$ was dissolved in a solvent in which fluorinated ethylene carbonate (FEC) and fluorinated ethyl methyl carbonate (FEMC) were mixed at a volume ratio of 1:3 to prepare a nonaqueous electrolytic solution.

Comparative Example 1

As a first electrolyte of a positive electrode, an ionic liquid (molten salt) was prepared by mixing $CuCl_2$ and 1-methyl-3-ethylimidazolium chloride (MEICl) at a molar ratio of 1:4. A copper porous body having a porosity of 80% and a thickness of 300 μm was prepared as a positive electrode current collector, and the positive electrode current collector was impregnated with the first electrolyte and held. As a positive electrode lead, a copper foil having a thickness of 10 μm was electrically bonded to the positive electrode current collector to prepare a positive electrode.

For the negative electrode, the second electrolyte, the first separator, and the second separator, the same materials as in Example 1 were used.

A thin secondary battery was produced in the same manner as described in Example 1, except that the positive electrode and the first electrolyte were used.

Comparative Example 2

As a first electrolyte of a positive electrode, an ionic liquid (molten salt) was prepared by mixing $FeCl_3$ and 1-methyl-3-ethylimidazolium chloride (MEICl) at a molar ratio of 1:4. A nickel porous body having a porosity of 80% and a thickness of 300 μm was prepared as a positive electrode current collector, and the positive electrode current collector was impregnated with the first electrolyte and held. As a positive electrode lead, a nickel foil having a thickness of 10 μm was electrically bonded to the positive electrode current collector to prepare a positive electrode.

For the negative electrode, the second electrolyte, the first separator, and the second separator, the same materials as in Example 1 were used.

A thin secondary battery was produced in the same manner as described in Example 1, except that the positive electrode and the first electrolyte were used.

Comparative Example 3

A surface of a carbon porous body having a porosity of 80% and a thickness of 300 μm was coated with sulfur. As a positive electrode lead, a nickel foil having a thickness of 10 μm was electrically bonded to the obtained positive electrode. As a first electrolyte, 1 mol/L of a lithium salt of $LiPF_6$ was dissolved in a solvent in which propylene carbonate (PC) and diethoxyethane (DEE) were mixed at a volume ratio of 1:1 to prepare a nonaqueous electrolytic solution. The positive electrode was impregnated with the nonaqueous electrolytic solution.

For the negative electrode, the second electrolyte, the first separator, and the second separator, the same materials as in Example 1 were used.

A thin secondary battery was produced in the same manner as described in Example 1, except that the positive electrode and the first electrolyte were used.

Comparative Example 4

The first separator was not used and only the second separator was used as a separator. In addition, instead of the first electrolyte and the second electrolyte, $AlCl_3$, 1-methyl-3-ethylimidazolium chloride (MEICl), and LiCl were mixed at a molar ratio of 1:0.9:0.1 to prepare an ionic liquid (molten salt). The ionic liquid was used as the nonaqueous electrolytic solution.

The separator was arranged between the positive electrode and the negative electrode layer as in Example 1, and a thin secondary battery was produced in the same manner as described in Example 1, except that the separator was impregnated with the nonaqueous electrolytic solution.

Comparative Example 5

5% by weight of graphite powder as a conductive agent and 5% by weight of polyvinylidene fluoride (PVdF) as a binder were mixed with $LiMn_2O_4$ particles and dispersed in n-methylpyrrolidone (NMP) solvent to prepare a slurry. The slurry was applied to both surfaces of an aluminum alloy foil (purity of 99%) having a thickness of 15 μm and dried, and a positive electrode active material-containing layer was formed through a pressing process to prepare a positive electrode as described above.

The first separator (solid electrolyte layer) was not used and only the second separator was used as a separator. Instead of the first electrolyte and the second electrolyte, 1 mol/L of a lithium salt of $LiPF_6$ was dissolved in a solvent in which propylene carbonate (PC) and diethoxyethane (DEE) were mixed at a volume ratio of 1:1 to prepare a non-aqueous electrolytic solution. A negative electrode was prepared in the same manner as in Example 1.

A thin secondary battery was produced in the same manner as described in Example 1, except that the separator was arranged between the positive electrode and the negative electrode, and the separator was impregnated with the nonaqueous electrolytic solution.

Comparative Example 6

A thin secondary battery was produced in the same manner as described in Comparative Example 1.

Comparative Example 7

A positive electrode was prepared by electrically bonding a nickel foil having a thickness of 10 μm as a positive electrode lead to a carbon porous body having a porosity of 80% and a thickness of 300 μm.

The first separator was not used and only the second separator was used as a separator. Instead of the first electrolyte and the second electrolyte, $AlCl_3$, 1-methyl-3-ethylimidazolium chloride (MEICl), and LiCl were mixed at a molar ratio of 1:0.9:0.1 to prepare an ionic liquid (molten salt). The ionic liquid was used as the nonaqueous electrolytic solution.

A negative electrode made of an aluminum metal foil having a thickness of 30 m was prepared. The capacity of the aluminum metal was set to twice the capacity of the positive electrode.

A thin secondary battery was produced in the same manner as described in Example 1, except that the separator was arranged between the positive electrode and the negative electrode, and the separator was impregnated with the nonaqueous electrolytic solution.

After the obtained secondary battery was charged to 3.3 V at a constant current of 50 mA at 30° C. for 10 hours, the discharge capacity, the intermediate voltage, and the energy (Wh) were measured when the obtained secondary battery was discharged to 1.8 V at 50 mA.

As a charge cycle test, after the secondary battery was charged to 3.3 V at a constant current of 50 mA at 30° C. for 10 hours, the number of cycles in which the discharge was repeated to 1.8 V at 50 mA and the capacity retention ratio reached 80% was obtained as the number of times of cycle life.

In the secondary batteries of Example 14 and Comparative Example 6, as an over-charge and over-discharge cycle test, after the secondary battery was charged to 5 V at a constant current of 50 mA at 30° C., the number of cycles in which the discharge was repeated to 0 V at 50 mA and the capacity retention ratio reached 80% was obtained as the number of times of cycle life.

The results of these measurements are shown in Tables 4 and 5 below. Note that the mixed molar ratio represented by Y1/Y2 in Table 1 is the molar number Y1 of $AlX_3$ with respect to the molar number Y2 of MX.

TABLE 1

|  | Positive electrode current collector | First electrolyte of positive electrode (molar ratio) | Y1/Y2 | First separator | Negative electrode |
| --- | --- | --- | --- | --- | --- |
| Example 1 | Al | $AlCl_3$/MEICl/LiCl(2:0.9:0.1) | 2.2 | $Li_{1.3}Al_{0.3}Ti_{1.7}(PO_4)_3$ | Li |
| Example 2 | Al | $AlCl_3$/MEICl (2:1) | 2 | $Li_{1.3}Al_{0.3}Ti_{1.7}(PO_4)_3$ | Li |
| Example 3 | Al | $AlCl_3$/MEICl (3:1) | 3 | $Li_{1.3}Al_{0.3}Ti_{1.7}(PO_4)_3$ | Li |
| Example 4 | Al | $AlCl_3$/MEICl(3:2) | 1.5 | $Li_{1.3}Al_{0.3}Ti_{1.7}(PO_4)_3$ | Li |
| Example 5 | Al | $AlCl_3$/DMPICl/LiCl(2:0.9:0.1) | 2.2 | $Li_{1.3}Al_{0.3}Ti_{1.7}(PO_4)_3$ | Li |
| Example 6 | Al | $AlCl_3$/TMPACl/LiCl(2:0.9:0.1) | 2.2 | $Li_{1.3}Al_{0.3}Ti_{1.7}(PO_4)_3$ | Li |
| Example 7 | Al | $Al[(CF_3SO_2)_2N]_3$/Dipropylsulfone(1:3) | — | $Li_{1.3}Al_{0.3}Ti_{1.7}(PO_4)_3$ | Li |
| Example 8 | Al | $AlCl_3$/Dipropylsulfone(1:3) | — | $Li_{1.3}Al_{0.3}Ti_{1.7}(PO_4)_3$ | Li |
| Example 9 | Al | $AlCl_3$/MEICl/LiCl(2:0.9:0.1) | 2.2 | $Li_{1.3}Al_{0.3}Ti_{1.7}(PO_4)_3$ | Li |
| Example 10 | Al | $AlCl_3$/MEICl/LiCl(2:0.9:0.1) | 2.2 | $Li_{1.3}Al_{0.3}Ti_{1.7}(PO_4)_3$ | Li-Al alloy |
| Example 11 | Al | $AlCl_3$/MEICl/LiCl(2:0.9:0.1) | 2.2 | $Li_{1.3}Al_{0.3}Ti_{1.7}(PO_4)_3$ | Li-Graphite |
| Example 12 | Al | $AlCl_3$/MEICl/LiCl(2:0.9:0.1) | 2.2 | $Li_{1.3}Al_{0.3}Ti_{1.7}(PO_4)_3$ | Li |
| Example 13 | Al | $AlCl_3$/MEICl/LiCl(2:0.9:0.1) | 2.2 | $Li_7La_3Zr_2O_{12}$ | Li |
| Example 14 | Al | $AlCl_3$/MEICl/LiCl(2:0.9:0.1) | 2.2 | $Li_{1.3}Al_{0.3}Ti_{1.7}(PO_4)_3$ | Li |
| Example 15 | Carbon | $AlCl_3$/MEICl/LiCl(2:0.9:0.1) | 2.2 | $Li_{1.3}Al_{0.3}Ti_{1.7}(PO_4)_3$ | Li |
| Example 16 | Al | $AlCl_3$/MEICl/LiCl(2:0.9:0.1) | 2.2 | $Li_{1.3}Al_{0.3}Ti_{1.7}(PO_4)_3$ | Li |

TABLE 2

|  | Second separator Second electrolyte (molar ratio) | Second separator Porous layer | Thickness ratio of first separator to second separator (T1:T2) |
| --- | --- | --- | --- |
| Example 1 | $LiPF_6$ 1 mol/L in mixed solvent of EC and DEE (volume ratio 1:1) | PE porous membrane | T1:T2 = 5:1 |
| Example 2 | $LiPF_6$ 1 mol/L in mixed solvent of EC and DEE (volume ratio 1:1) | PE porous membrane | T1:T2 = 5:1 |
| Example 3 | $LiPF_6$ 1 mol/L in mixed solvent of EC and DEE (volume ratio 1:1) | PE porous membrane | T1:T2 = 5:1 |
| Example 4 | $LiPF_6$ 1 mol/L in mixed solvent of EC and DEE (volume ratio 1:1) | PE porous membrane | T1:T2 = 5:1 |
| Example 5 | $LiPF_6$ 1 mol/L in mixed solvent of EC and DEE (volume ratio 1:1) | PE porous membrane | T1:T2 = 5:1 |
| Example 6 | $LiPF_6$ 1 mol/L in mixed solvent of EC and DEE (volume ratio 1:1) | PE porous membrane | T1:T2 = 5:1 |
| Example 7 | $LiPF_6$ 1 mol/L in mixed solvent of EC and DEE (volume ratio 1:1) | PE porous membrane | T1:T2 = 5:1 |
| Example 8 | $LiPF_6$ 1 mol/L in mixed solvent of EC and DEE (volume ratio 1:1) | PE porous membrane | T1:T2 = 5:1 |
| Example 9 | $LiPF_6$ 1 mol/L in mixed solvent of EC and THF (volume ratio 1:1) | PE porous membrane | T1:T2 = 9:1 |
| Example 10 | $Li[(CF_3SO_2)_2N]$ 2 mol/L in mixed solvent of EC and DME (volume ratio 1:1) | PE porous membrane | T1:T2 = 9:1 |
| Example 11 | $Li[(CF_3SO_2)_2N]$ 2 mol/L in mixed solvent of EC and 2Me-THF (volume ratio 1:1) | PE porous membrane | T1:T2 = 9:1 |

TABLE 2-continued

|  | Second separator Second electrolyte (molar ratio) | Second separator Porous layer | Thickness ratio of first separator to second separator (T1:T2) |
|---|---|---|---|
| Example 12 | $LiPF_6$ 1 mol/L in mixed solvent of EC and DEE (volume ratio 1:1) | PE porous membrane | T1:T2 = 9:1 |
| Example 13 | $LiPF_6$ 1 mol/L in mixed solvent of EC and DEE (volume ratio 1:1) | PE porous membrane | T1:T2 = 9:1 |
| Example 14 | $LiPF_6$ 1 mol/L in mixed solvent of EC and DEE (volume ratio 1:1) | PE porous membrane | T1:T2 = 5:1 |
| Example 15 | $LiPF_6$ 1 mol/L in mixed solvent of EC and DEE (volume ratio 1:1) | PE porous membrane | T1:T2 = 5:1 |
| Example 16 | $Li[(CF_3SO_2)_2N]$ 1 mol/L in mixed solvent of FEC and FEMC (volume ratio 1:3) | PE porous membrane | T1:T2 = 5:1 |

TABLE 3

|  | Positive electrode | Electrolyte (molar ratio) | Separator | Negative electrode |
|---|---|---|---|---|
| Comparative Example 1 | Cu | $CuCl_2$/MEICl (1:4) | $Li_{1.3}Al_{0.3}Ti_{1.7}(PO_4)_3$ | Li |
| Comparative Example 2 | Fe | $FeCl_3$/MEICl (1:4) | $Li_{1.3}Al_{0.3}Ti_{1.7}(PO_4)_3$ | Li |
| Comparative Example 3 | S/C (4:1) | 1M $LiPF_6$-PC/DEE (1:1) | $Li_{1.3}Al_{0.3}Ti_{1.7}(PO_4)_3$ | Li |
| Comparative Example 4 | Al | $AlCl_3$/MEICl/LiCl (1:0.9:0.1) | PE porous membrane | Li |
| Comparative Example 5 | $LiMn_2O_4$ | 1M $LiPF_6$-PC/DEE (1:1) | PE porous membrane | Li |
| Comparative Example 6 | Cu | $CuCl_2$/MEICl (1:4) | $Li_{1.3}Al_{0.3}Ti_{1.7}(PO_4)_3$ | Li |
| Comparative Example 7 | C | $AlCl_3$/MEICl/LiCl (1:0.9:0.1) | PE porous membrane | Al |

TABLE 4

|  | Discharge capacity (mAh) | Intermediate voltage (V) | Energy (Wh) | Number of times of cycle life |
|---|---|---|---|---|
| Example 1 | 800 | 2.7 | 2.16 | 600 |
| Example 2 | 750 | 2.7 | 2.025 | 500 |
| Example 3 | 760 | 2.75 | 2.09 | 500 |
| Example 4 | 700 | 2.55 | 1.785 | 400 |
| Example 5 | 800 | 2.7 | 2.16 | 650 |
| Example 6 | 780 | 2.7 | 2.106 | 700 |
| Example 7 | 500 | 2.6 | 1.3 | 300 |
| Example 8 | 600 | 2.65 | 1.59 | 400 |
| Example 9 | 800 | 2.65 | 2.12 | 400 |
| Example 10 | 600 | 2.6 | 1.56 | 1000 |
| Example 11 | 400 | 2.55 | 1.02 | 1000 |
| Example 12 | 750 | 2.7 | 2.025 | 650 |
| Example 13 | 700 | 2.7 | 1.89 | 500 |
| Example 15 | 600 | 2.7 | 1.62 | 700 |
| Example 16 | 800 | 2.7 | 2.16 | 1000 |
| Comparative Example 1 | 200 | 3.2 | 0.64 | 600 |
| Comparative Example 2 | 300 | 2.4 | 0.72 | 600 |
| Comparative Example 3 | 400 | 2 | 0.8 | 400 |
| Comparative Example 4 | 100 | 1.8 | 0.18 | 100 |
| Comparative Example 5 | 300 | 2.8 | 0.84 | 300 |
| Comparative Example 7 | 10 | 2.0 | 0.02 | 10 |

TABLE 5

|  | Discharge capacity (mAh) | Intermediate voltage (V) | Energy (Wh) | Number of times of over-charge and over-discharge cycle |
|---|---|---|---|---|
| Example 14 | 800 | 2.7 | 2.16 | 500 |
| Comparative Example 6 | 200 | 3.2 | 0.64 | 10 |

As is apparent from Tables 1 to 4, the secondary batteries of Examples 1 to 16 are excellent in discharge capacity, energy, and cycle life performance as compared with Comparative Examples 1 to 7. As described above, the secondary battery of Example 1 has both high energy density per weight and high energy density per volume. It can be said that the secondary batteries of Examples 2 to 16 are excellent in both the energy density per weight and the energy density per volume since the energy of ½ or more of the energy of Example 1 is obtained. In addition, in Table 5, it is understood from the comparison between Example 1 and Example 14 that the reduction in the cycle life of the secondary battery of Example 1 is 100 cycles under overcharge and over-discharge conditions. On the other hand, it is understood from the comparison between Comparative Example 1 and Comparative Example 6 that the reduction in cycle life of the secondary battery of Comparative Example 1 is remarkable under over-charge and over-discharge conditions as compared with Examples. Therefore, it can be said that the secondary batteries of Examples are excellent in over-charge and over-discharge cycle performance.

In Comparative Example 4, since the separator is a polyolefin porous membrane and does not exhibit lithium ion conductivity and also the first electrolyte is in contact with the lithium metal foil that is the negative electrode layer, the discharge capacity, the energy, and the cycle life performance are all inferior.

On the other hand, Comparative Example 7 is an aluminum battery that uses aluminum in the negative electrode.

The aluminum battery of Comparative Example 7 is inferior in discharge capacity, energy, and cycle life performance.

According to the secondary battery of at least one embodiment or Example described above, since the positive electrode containing the first electrolyte containing aluminum ions, the negative electrode capable of allowing lithium ions to be inserted and extracted, and the separator having lithium ion conductivity are included, it is possible to provide the lightweight secondary battery that performs the charge and discharge with high coulomb efficiency, has high energy density, and is excellent in cycle life performance and durability performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising
    a positive electrode comprising a first electrolyte containing an aluminum salt and at least one kind selected from the group consisting of an organic solvent, an imidazolium salt, a quaternary ammonium salt, and a lithium salt;
    a negative electrode capable of allowing lithium ions to be inserted and extracted;
    a separator disposed between the positive electrode and the negative electrode and having lithium ion conductivity, the separator comprising a first separator and a second separator; and
    a liquid second electrolyte held in the negative electrode and the second separator, and comprising an organic solvent and a lithium salt dissolved in the organic solvent,
    wherein the negative electrode comprises a negative electrode layer comprising at least one kind selected from the group consisting of a lithium metal, a lithium alloy, and a compound capable of allowing lithium ions to be inserted and extracted,
    wherein the first separator is a layer comprising a lithium ion conductive solid electrolyte and has a principal surface facing the positive electrode, and,
    wherein the second separator comprises a porous layer and having a principal surface facing the negative electrode,
    wherein the first electrolyte comprises (i) $AlX_3$ as the aluminum salt, where X is a halogen ion, and (ii) MX as the imidazolium salt and/or the quaternary ammonium salt, and
    wherein a mixed molar ratio represented by Y1/Y2 is in a range of from 0.9 to 3, where Y1 is a molar number of $AlX_3$ and Y2 is a molar number of MX.

2. The secondary battery according to claim 1, wherein the positive electrode comprises a porous body and the first electrolyte held in the porous body.

3. The secondary battery according to claim 1, wherein the first electrolyte is an ionic liquid comprising at least one kind of cation selected from the group consisting of an alkylimidazolium cation, a quaternary ammonium cation, and a lithium ion.

4. The secondary battery according to claim 1, wherein the separator having the lithium ion conductivity comprises a lithium ion conductive solid electrolyte.

5. The secondary battery according to claim 1, wherein the first separator is a layer comprising a lithium ion conductive solid electrolyte, and the second separator comprises a porous layer.

6. A battery pack comprising the secondary battery according to claim 1.

7. The battery pack according to claim 6, further comprising an external power distribution terminal and a protective circuit.

8. The battery pack according to claim 6, further comprising a plurality of the secondary battery, the secondary batteries being electrically connected in series, in parallel, or in a combination of in-series connection and in-parallel connection.

9. A vehicle comprising the battery pack according to claim 6.

10. A stationary power supply comprising the battery pack according to claim 6.

11. The secondary battery according to claim 1, wherein the separator comprises a first separator selectively transmitting lithium ions.

12. The secondary battery according to claim 1, wherein the organic solvent comprises at least one selected from the group consisting of cyclic carbonates, chain carbonates, dimethoxyethane, diethoxyethane, tetrahydrofuran, 2-methyltetrahydrofuran, fluorinated cyclic carbonate, fluorinated chain carbonate, and fluorinated ether.

13. The secondary battery according to claim 1, wherein the separator is an inorganic material.

14. The secondary battery according to claim 1, wherein the separator comprises an oxide solid electrolyte having a garnet structure and/or a lithium phosphate solid electrolyte having a NASICON structure.

15. The secondary battery according to claim 1, which is suitable to operate at room temperature.

16. The secondary battery according to claim 1, which is suitable to operate at 30° C.

17. The secondary battery according to claim 1, wherein the negative electrode layer comprises at least one kind selected from the group consisting of a solid lithium metal, a solid lithium alloy, and a solid compound capable of allowing lithium ions to be inserted and extracted.

18. The secondary battery according to claim 1, wherein the mixed molar ratio represented by Y1/Y2 is in a range of from 1.5 to 3.

19. The secondary battery according to claim 1, wherein the mixed molar ratio represented by Y1/Y2 is in a range of from 2 to 3.

20. The secondary battery according to claim 1, wherein the mixed molar ratio represented by Y1/Y2 is in a range of from 2.2 to 3.

* * * * *